(12) United States Patent
Krechel et al.

(10) Patent No.: US 11,780,770 B2
(45) Date of Patent: Oct. 10, 2023

(54) GLASS ELEMENT COMPRISING ENAMEL COATING AND USE THEREOF, COATING AGENT FOR MAKING SAME, AND METHOD FOR PRODUCING THE COATING AGENT

(71) Applicant: SCHOTT AG, Mainz (DE)

(72) Inventors: Ricarda Krechel, Mainz (DE); Vera Steigenberger, Bischofsheim (DE); Michael Schwall, Knoxville, TN (US); Daniel Caldwell, Chattanooga, TN (US); Ioannis Neitzel, Bobingen (DE); Kurt Nattermann, Ockenheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 17/468,900

(22) Filed: Sep. 8, 2021

(65) Prior Publication Data
US 2022/0073420 A1   Mar. 10, 2022

(30) Foreign Application Priority Data
Sep. 8, 2020  (DE) .................... 10 2020 123 403.1

(51) Int. Cl.
*C03C 17/04* (2006.01)
*C03C 3/078* (2006.01)
(Continued)

(52) U.S. Cl.
CPC .............. *C03C 17/04* (2013.01); *C03C 3/078* (2013.01); *C03C 8/04* (2013.01); *C03C 8/06* (2013.01);
(Continued)

(58) Field of Classification Search
CPC ........... C03C 17/04; C03C 3/078; C03C 8/04; C03C 8/06; C03C 8/08; C03C 8/14;
(Continued)

(56) References Cited

U.S. PATENT DOCUMENTS 5,412,877 A    5/1995  Mckendrick
5,691,254 A *  11/1997  Sakamoto ............. C03C 17/007
                                                          501/71
(Continued)

FOREIGN PATENT DOCUMENTS

DE   102006028763   12/2007
DE   102014220457    4/2016
(Continued)

OTHER PUBLICATIONS

WO 2020042738 A1 (Year: 2020).*
(Continued)

*Primary Examiner* — Betelhem Shewareged
(74) *Attorney, Agent, or Firm* — Ruggiero McAllister & McMahon LLC

(57) ABSTRACT

Glass elements are provided that include a coating and a sheet-like glass substrate. The sheet-like glass substrate has a first surface and a second surface opposite the first surface. The coating is disposed in at least some areas of at least one of the first and second surfaces. The coating is an inorganic glass-based coating that includes at least one glassy component; at least one pigment comprising pigment particles; and a filler. The filler is inorganic and includes filler particles with a $d_{50}$ value, based on an equivalent diameter, of at least 0.1 µm and less than 10 µm.

19 Claims, 4 Drawing Sheets

(51) Int. Cl.
    *C03C 8/04*     (2006.01)
    *C03C 8/06*     (2006.01)
    *C03C 8/08*     (2006.01)
    *C03C 8/14*     (2006.01)
    *C03C 17/00*     (2006.01)

(52) U.S. Cl.
    CPC .................. *C03C 8/08* (2013.01); *C03C 8/14* (2013.01); *C03C 17/007* (2013.01); *C03C 2207/00* (2013.01); *C03C 2217/452* (2013.01); *C03C 2217/485* (2013.01)

(58) Field of Classification Search
    CPC .............. C03C 17/007; C03C 2207/00; C03C 2217/452; C03C 2217/485
    USPC ........................................................ 428/207
    See application file for complete search history.

(56) References Cited

U.S. PATENT DOCUMENTS

| | | |
|---|---|---|
| 2013/0174608 A1 | 7/2013 | Takeuchi |
| 2013/0287989 A1 | 10/2013 | Kawanami |
| 2016/0031748 A1 | 2/2016 | Maeda |
| 2016/0185657 A1 | 6/2016 | Sakoske |
| 2016/0376190 A1 | 12/2016 | Karagöz |
| 2020/0189967 A1 | 6/2020 | Compoint |
| 2020/0189968 A1 | 6/2020 | Siebers |
| 2022/0033675 A1 | 2/2022 | Viandier |
| 2022/0073420 A1* | 3/2022 | Krechel .................... C03C 4/02 |

FOREIGN PATENT DOCUMENTS

| | | |
|---|---|---|
| DE | 102015110121 | 12/2016 |
| FR | 3090621 | 6/2020 |

OTHER PUBLICATIONS

JP-H08175852-A (Year: 1996).*
Properties: Zirconia—ZrO2—Zirconium Dioxide (Year: 2022).*
ISO 7991, "Glass—Determination of coefficient of mean linear thermal expansion", Dec. 15, 1987, 12 pages.
DIN ISO 3537, "Road vehicles—Safety glazing materials—Mechanical tests", Feb. 2018, with English translation, 28 pages, Replaces DIN 52306.

* cited by examiner

GLASS ELEMENT COMPRISING ENAMEL COATING AND USE THEREOF, COATING AGENT FOR MAKING SAME, AND METHOD FOR PRODUCING THE COATING AGENT

CROSS REFERENCE TO RELATED APPLICATIONS

This application claims benefit under 35 USC § 119 of German Application 10 2020 123 403.1 filed Sep. 8, 2020, the entire contents of which are incorporated herein by reference.

BACKGROUND

1. Field of the Invention

The present invention generally relates to glass elements, in particular glass elements comprising at least one coating that is disposed on at least one side of the glass element. Further aspects of the invention relate to a coating agent, a method for producing it, and to the use of such a glass element.

2. Description of Related Art

Glass sheets for application in household appliances are often coated with so-called decors, i.e. inorganic glass-based enamel layers, for design reasons and functional purposes. However, it has been known that such decors or enamel layers reduce the breaking strength of the glass sheets.

To solve the issue of reduced strength of a glass sheet printed with an enamel layer as well as other problems such as the provision of a particularly chemically resistant coating, U.S. patent application US 2016/0185657 A1 proposes a multilayer enamel. Each layer of this multilayer enamel is printed and then fired before the next layer is applied, and thereby each layer can be adapted to the respective application purpose. However, such a procedure is complex and costly. Furthermore, the coating can flake off when a critical layer thickness is exceeded, which depends on the thermal expansion coefficient or the difference between the coefficients of thermal expansion of the coating and the substrate.

It has also been known to add fillers to liquid coating materials, in particular for reasons of cost, because fillers are usually cheaper than other components such as pigments, or because fillers may impart certain advantageous properties to the resulting coating. Filler is generally understood to mean an additive to a composition or a material. A filler can change the properties of the composition under consideration, for example its processability. Moreover, fillers are often cheaper than other components of the composition.

For example, U.S. patent document U.S. Pat. No. 5,691,254 describes an enamel composition for coating a low-expansion glass ceramic such as used as a cooking surface, for example. In addition to a glass component and the one or more color pigment(s), the enamel coating may also comprise up to 54 wt % of filler, the filler being added in order to achieve a particularly abrasion-resistant enamel coating. According to U.S. Pat. No. 5,691,254, the filler in particular comprises zirconium or zirconium oxide. An improvement in the mechanical strength of the coated glass ceramic plate is not addressed.

U.S. patent document U.S. Pat. No. 5,412,877 also discloses a composition of a ceramic paint (or enamel) with a low melting point, which may include a filler, and the filler is used for adjusting the firing conditions or the coefficient of thermal expansion of the enamel coating, for example. The glass frit comprises lead oxide, PbO. An improvement of the mechanical strength of the coated glass panel is not addressed here either.

Furthermore, U.S. patent document US 2016/0031748 A1 discloses a ceramic paint which comprises a filler as well. The ceramic paint is coated onto a metallic substrate. The coating of a glass substrate is not discussed.

There is thus a demand for glass elements comprising a coating which at least mitigates the problems of the prior art mentioned above, in particular with regard to breaking strength. There is also a demand for improved coating compositions.

SUMMARY

The object of the invention is to provide glass elements which comprise a coating and at the same time exhibit high mechanical strength, in particular high breaking strength.

Thus, the present disclosure relates to a glass element, in particular a toughened glass element, preferably a thermally toughened glass element, comprising a sheet-like glass substrate having a first surface and a second surface opposite the first surface and a coating disposed in at least some areas of at least one of the surfaces of the glass substrate. The coating is in the form of an inorganic glass-based coating, preferably an enamel coating, comprising at least one glassy component, at least one pigment comprising pigment particles and a filler. The filler is inorganic. The filler comprises filler particles with a $d_{50}$ value, based on an equivalent diameter, of at least 0.1 μm, preferably at least 0.3 μm and less than 10 μm, preferably less than 5 μm.

As an alternative or in addition to the filler, the coating may also comprise a further glassy component.

Preferably, a coefficient of thermal expansion of the coating is resulting from the composition of the coating, which is less than or equal to the coefficient of thermal expansion of the glass substrate. The coefficient of thermal expansion of the coating is preferably smaller than that of the glass substrate.

In the context of the present disclosure, the coefficient of thermal expansion resulting from the composition of the coating may also be referred to as the "resulting thermal expansion coefficient" of the coating. If reference is made only to the thermal expansion coefficient of the coating, this is also understood to mean the "resulting thermal expansion coefficient" of the coating.

Such a configuration of a glass element is advantageous because in this way, in particular due to the addition of the filler, it is possible to vary and adjust the composition of the coating such that a glass element can be obtained which exhibits increased mechanical strength in comparison to prior art glass elements which also have a glass-based coating, for example an enamel coating (which may also be referred to as a "decor" or "decorative layer"). In other words, it is possible with such a configuration, for example, to obtain a glass element provided with a glass-based coating comprising fillers, which is thinner and has the same strength as a glass element with a conventional glass-based coating, which however has an increased substrate thickness.

The glass element may in particular be provided in toughened form, for example thermally toughened. This is advantageous because it increases the strength of the glass against mechanical stress.

The filler is inorganic, which is advantageous because in this way it will be thermally stable even at high firing temperatures which are common for glass-based or glass flux-based coatings such as enamel coatings. Thermal stability in particular means that the filler does not decompose. This is in particular understood to mean that the filler does not break down into new phases by a decomposition reaction. For example, it is even possible for the filler to be thermally stable in the sense that the structural integrity of the filler is also retained during the firing process of the coating. The filler is preferably in the form of an inorganically oxidic filler.

The filler is in a form so as to comprise filler particles with a $d_{50}$ value, based on the equivalent diameter, of at least 0.1 µm, preferably at least 0.3 µm, and less than 10 µm, preferably less than 5 µm.

The coating can be designed such that the filler particles do not protrude from the coating, i.e. in particular so that the filler particles do not form any elevations on the coating or project from the coating. According to one embodiment, the glass element is implemented such that the filler particles are completely enveloped by the glassy component. Such a configuration can be particularly advantageous for obtaining a smooth, scratch-resistant coating and/or a coating that is easy to clean. Advantageously, this can in particular be achieved by a small $d_{50}$ value of the equivalent diameter of the filler particles of less than 10 µm, preferably less than 5 µm or even less than 1 µm. On the other hand, the filler particles should not be too small either, since otherwise the need for the glassy components, i.e. the binder, becomes too high and/or it will no longer be possible to obtain sufficient adhesion for the coating. Therefore, the $d_{50}$ value for the equivalent diameter of the filler particles is preferably at least 0.1 µm, preferably at least 0.3 µm.

If the coating comprises a further glassy component, as an alternative or in addition to the filler, then the coating may generally be in a form so as to comprise an inhomogeneous glass material. Thus, according to this embodiment, the coating comprises a glass material which preferably includes two glassy phases which have a different composition, for example.

For the purposes of the present disclosure, the following definitions shall apply:

Glass element is understood to mean a refined glass substrate. More particularly, glass element can be understood as comprising a glass substrate and at least one coating disposed at least in areas on at least one surface of the glass substrate.

Glass substrate is understood to mean a shaped body made of or comprising a glassy material.

Glassy material (or glass) refers to an inorganic material that is obtained from a batch in a melting process. The glassy material may in particular be an oxidic material. The melting process may be followed by a further process which is known as hot forming, during which the glassy material is formed into a shaped body. Such shaping processes may include drawing, floating, or rolling, for example.

The glass substrate is in particular provided in the form of a sheet, and in this case the glass substrate may be flat or may else be arched, angled or curved. Sheet-like shaped body is understood to mean a form of a body in which the lateral dimension of the shaped body in a first spatial direction of a Cartesian coordinate system is at least one order of magnitude smaller than in the other two spatial directions perpendicular to this first spatial direction. This first spatial direction may also be referred to as the thickness of the shaped body. In other words, a shaped body in the sense of the present disclosure is sheet-like if its thickness is at least one order of magnitude smaller than the length and width thereof. If the length and width of the shaped body are of the same order of magnitude, the shaped body can also be referred to as a sheet; if the length is significantly greater than the width, it may also be referred to as a ribbon. Therefore, a sheet-like glass substrate is in particular also understood to mean a glass sheet here, and this glass sheet may be flat or else arched or curved or angled, for example like a curved viewing window.

Since a glass element is a refined glass substrate, a surface or main surface of a glass substrate can correspondingly also be referred to as the surface or main surface of the glass element. The statements regarding length, width, and thickness of the glass substrate therefore apply to the glass element correspondingly, while with regard to the thickness it has to be noted that, for a coated area, the thickness of the glass element corresponds to the thickness of the glass substrate plus the thickness of the coating. However, because of the only very small thickness of the coating compared to the thickness of the glass substrate, the thickness of the glass substrate can be regarded as being approximately equal to the thickness of the glass element, here, for practical purposes.

In the context of the present disclosure, the surfaces of the glass substrate are understood to mean the main faces or main surfaces of the glass substrate, which may also be referred to as the "sides" of a sheet, for example (e.g. front or rear side). In other words, the surfaces or main faces or main surfaces are those surfaces of the shaped body which together make up more than 50% of the total surface of the shaped body. Thus, the edge faces of the glass substrate are not referred to as surfaces in the context of the present disclosure.

The surfaces of the sheet-like glass substrate can in particular be formed parallel to one another, at least within the range of customary manufacturing tolerances.

Equivalent diameter of a particle is understood to mean the volume-equivalent diameter in the context of the present disclosure. It indicates the diameter a particle with a particular volume had if the particle was perfectly spherical. This is a common parameter for characterizing substances that are usually provided in particulate form, such as pigments and/or fillers. As far as a particle size is specified within the context of the present disclosure, this is understood to mean a specification of the $d_{50}$ value based on the equivalent diameter in each case, unless expressly stated otherwise.

In the context of the present disclosure it is understood that a pigment is a coloring body which is usually present in particle form. Therefore, as far as stated within the context of the present disclosure that a coating comprises a pigment, this is understood to mean that the coating comprises pigment particles. This similarly applies to the filler as well, which is usually also included in coatings in the form of particles. To avoid misunderstandings, an individual particle of a filler or of a pigment will be referred to as a filler or pigment particle. The pigments may come in the form of absorption pigments which impart a color to the coating due to selective absorption of visible light, or may act as a pigment due to light scattering (this is usually the case with white pigments) or may be in the form of so-called effect pigments which, for example, change color (also known as flop) and/or create a so-called metallic effect. In the context of the present disclosure, the pigments are in particular inorganic, preferably inorganic and high temperature-resistant, that is to say in particular stable up to at least 500° C. Such pigments can also be referred to as ceramic coloring bodies or ceramic pigments.

As far as the coefficient of thermal expansion of a glass or a glassy component is mentioned in the context of the present disclosure, this refers to the coefficient of linear thermal expansion, a, in the context of the present disclosure, preferably specified for the range from 20° C. to 300° C. The value specified for glasses is the nominal mean coefficient of linear thermal expansion which is determined in compliance with DIN ISO 7991 in a static measurement for glasses. More generally, in the context of the present disclosure, the coefficient of thermal expansion refers to the coefficient of linear thermal expansion, $\alpha$, and is preferably specified for the range from 20° C. to 300° C. The designations $\alpha$ and $\alpha_{20-300}$ are used synonymously in the present document. The coefficient of thermal expansion may also be referred to as CTE in the context of the present document. For powders, the coefficient of thermal expansion is usually determined by compacting the powder and determining the coefficient of linear thermal expansion on the basis of the molded body obtained in this way, by measuring the change in length as a function of temperature.

It is known that the coefficient of thermal expansion of a mixture, $\alpha_M$, can be calculated using the following formula:

$$\alpha_M = \Sigma_i v_i \times \alpha_i.$$

Here, $\alpha_i$ is the linear coefficient of thermal expansion of a component i, and $v_i$ is the volume fraction thereof. The volume of a component can be converted into the mass thereof simply by multiplying it by the corresponding density of the component. In other words, the volume fraction of the individual components is multiplied by the coefficient of thermal expansion of the respective components. The resulting products are then added up to give the resulting coefficient of thermal expansion of the mixture under consideration, $\alpha_M$. For the inorganic glass-based coating considered here, these components in particular include at least one glassy component, for example a glass flux, at least one pigment, and at least one filler. In a manner similar to that for the coating, the resulting coefficient of thermal expansion $\alpha_M$ can be calculated from the composition of a coating agent or paste by making the calculation based on the solid components of the coating agent.

In the context of the present disclosure, coating agent is understood to mean a liquid or pasty material which is intended to be applied onto a substrate so that, after a drying and/or firing process, a material layer is resulting, which is preferably firmly bonded to the substrate. A coating agent can also be referred to as a decorative paint or as a paste or an enamel paint.

An embodiment of the glass element according to claim 1 is advantageous because the use of an inorganic filler and/or of a further glassy component allows to achieve high temperature stability of the inorganic coating. If a filler is used, the equivalent diameter of the filler or of the filler particles included in the filler can vary within a wide range. This makes it possible to flexibly chose the filler depending on the properties to be achieved and/or to flexibly chose the filler depending on the nature of the other components of the coating. For example, a lower equivalent diameter of the filler particles can be advantageous if, for example, the glassy component of the coating agent also includes particles with a small equivalent diameter. If, by contrast, the coating or the coating agent comprises larger particles, for example a pigment which includes larger particles, it can be advantageous to have filler particles with a larger equivalent diameter. At the same time it is possible with such a configuration to provide a glass element that has increased mechanical strength compared to conventional glass elements. This can in particular be advantageously promoted by having a resulting coefficient of thermal expansion of the coating preferably lower than the coefficient of thermal expansion of the glass substrate. In this way, a type of compressive stress can even be obtained by the coating and exerted on the surface of the glass element, similar to a thermal pre-stress, i.e. a toughened state as obtained by a thermal process, for example. This can further support the development of improved strength of the glass element.

It can also be advantageous if, as an alternative or in addition to the filler, a further glassy component is used as a constituent of the coating. For example, this can be especially advantageous when large pigment particles are used, in order to ensure better enveloping thereof. Also, the adhesive strength of a coating can be improved by adding a further glassy component as an alternative or in addition to a filler, since in this way the fraction of the glassy matrix is increased relative to the particle content of the paint consisting of pigment particles and optionally filler particles.

With a composition of the coating as discussed above, it is in particular possible to achieve a particularly high mechanical strength of the glass element.

According to one embodiment, the glass element is designed so that the filler particles and/or the further glassy component have a coefficient of thermal expansion of at least $0.5*10^{-6}$/K and preferably of at most $15*10^{-6}$/K, more preferably of at most $10*10^{-6}$/K, $8*10^{-6}$/K, yet more preferably of at most $5*10^{-6}$/K, yet more preferably of at most $3*10^{-6}$/K and most preferably of not more than $0.6*10^{-6}$/K. In other words, the filler particles or the filler or the further glassy component has a relatively low coefficient of linear thermal expansion, in particular in comparison to conventional glassy materials such as, for example, borosilicate glass or soda-lime glasses which have a coefficient of linear thermal expansion which, with more than $3.0*10^{-6}$/K, is significantly higher. More particularly, the linear coefficient of thermal expansion of soda-lime glass is about $9*10^{-6}$/K and is therefore significantly greater than the coefficient of thermal expansion of the filler.

This can be particularly advantageous especially if a particularly low resulting coefficient of thermal expansion of the coating is to be obtained. This is because it has been found that a lower resulting coefficient of thermal expansion of a glass-based coating can lead to an improved strength of the glass element.

However, it is not necessary or useful in all cases to achieve a particularly low coefficient of thermal expansion for the glass-based coating. Rather, it can be useful to adjust the resulting coefficient of thermal expansion of the coating by adding a filler and/or a further glassy component that includes filler particles with a low coefficient of thermal expansion between at least $0.5*10^{-6}$/K and preferably at most $15*10^{-6}$/K, more preferably at most $10*10^{-6}$/K, $8*10^{-6}$/K, yet more preferably at most $5*10^{-6}$/K, yet more preferably of at most $3*10^{-6}$/K, and most preferably not more than $0.6*10^{-6}$/K. Preferably, a resulting coefficient of thermal expansion of the coating of at most $9*10^{-6}$/K is obtained in this way, preferably $8.3*10^{-6}$/K, and preferably the resulting coefficient of thermal expansion of the coating is at least $6*10^{-6}$/K, most preferably at least $6.4*10^{-6}$/K. This can be advantageous because in this way a coating is obtained which has a resulting coefficient of thermal expansion that is matched to the commonly used substrate materials.

According to one embodiment, the differential between the thermal expansion coefficients of the glass substrate and the coating ranges between at least $0.5*10^{-6}$/K and at most $3.1*10^{-6}$/K. Here, the coefficient of thermal expansion of the coating is the resulting coefficient of thermal expansion of the coating. The differential between the coefficient of thermal expansion of the glass substrate and the resulting coefficient of thermal expansion of the coating results as the difference calculated from the coefficient of thermal expansion of the glass substrate and the resulting coefficient of thermal expansion of the coating. Thus, according to this embodiment, the resulting coefficient of thermal expansion is always smaller than the coefficient of thermal expansion of the glassy substrate material.

In other words, the differential of the thermal expansion coefficients is very small according to a preferred embodiment. It has been found possible in this way to achieve a particularly good mechanical strength of the glass element without otherwise impairing the properties of the glass element.

In fact, it would be possible, theoretically, to further reduce the resulting coefficient of thermal expansion by increasing the fraction of filler and/or of the further glassy component in the coating. This would theoretically allow to create a greater compressive stress at the surface of the glass element due to the difference in the expansion coefficients. However, it has to be considered here that, unlike a compressive stress zone in a thermally toughened glass substrate, the coating considered here is heterogeneous, consisting of a plurality of components each of which has a different coefficient of thermal expansion. Although the coefficient of thermal expansion of individual components can be varied, this is only possible within certain limits. Moreover, commonly used high-temperature-stable compounds that are employed as pigments have coefficients of thermal expansion that are quite high.

Therefore, a further increase of the amount of filler and the amount of the further glassy component in the coating so as to get an even lower resulting coefficient of thermal expansion of the coating might induce cracking in the coating. Also, it is not possible to arbitrarily increase the fraction of filler in the coating at the expense of the pigment and/or the glassy component. With an insufficient content of pigment in the coating, the coating might lose its opacity and/or it might become impossible to achieve an intended color location. Also, the proportion of the glassy component cannot be increased arbitrarily, since otherwise the coating might no longer exhibit a sufficient covering effect. Both would be disadvantageous. In fact, the covering effect and/or the adjustment of a color location is particularly important for the use of a glass element in applications in which the glass element is exposed to high thermal loads during operation, such as a door pane of a baking oven or a control panel of a household appliance, for example, so that control areas and dangerous areas of a device are clearly demarcated or so that safety lights such as so-called residual heat indicators or the like can be clearly associated with specific areas.

On the other hand, a reduction in the glassy component of the coating can lead to the resulting coating not having sufficient adhesive strength or only inadequate mechanical resistance, for example in the case of abrasive stress. This is because the glassy component in the coating is effective as a binding agent which melts when heated and bonds the other components of the coating to one another and to the glass substrate. Therefore, if this component is reduced too much at the expense of the other components, this can lead to the negative consequences as mentioned above, for example insufficient scratch resistance and/or abrasion resistance of the coating.

Therefore, as stated above, the difference in the thermal expansion coefficients of the glass substrate and the coating should preferably be between at least $0.5*10^{-6}$/K and at most $3.1*10^{-6}$/K.

According to one embodiment, in the area where the coating is disposed, the glass element has a color location with an L* value of more than 60 and an optical density of more than 1, or a color location of less than 60 and an optical density of more than 2.

According to one embodiment, the glass component of the binding agent is in the form of a glass flux or glass frit and comprises zinc oxide and/or bismuth oxide. Glass frits with a zinc oxide content in the range from 0.1 to 70 wt % and in particular with a zinc oxide content in the range from 0.1 to 30 wt % have proven to be particularly advantageous. Alternatively or in addition, the glass frit contains 0.1 to 75 wt % and in particular 8 to 75 wt % of bismuth oxide. The content of zinc oxide and bismuth oxide in the embodiments described above in particular has an advantageous effect on the softening temperature of the glass. According to a refinement of these embodiments, the glass frits have softening temperatures in the range from 500 to 950° C. Preferably, the softening temperature is less than 800° C., or even less than 750° C., and particularly preferably it is less than 680° C., but more than 450° C. Due to the low softening temperatures, a homogeneous glass matrix may form from the glass powder already at low firing temperatures, in particular if the coating or the coating agent does not comprise any further glassy components. Thus, glass substrates with different compositions (and thus different softening temperatures) can be coated with the paste without, during firing, lowering the viscosity of the glass substrate to be coated or of the resulting glass element.

Moreover, the bismuth oxide content in the glass increases the chemical resistance of the corresponding coating, i.e. the coating made from the paste.

Since the glass matrix in the coating of the coated substrate (or the element) has the same composition as the glass powder in the paste, the specifications regarding the composition of the glass powder also apply correspondingly to the composition of the glass matrix in the coating according to some embodiments or refinements. This applies at least to the case where the coating or the coating agent only comprises one glassy component. If the coating agent or the coating generally comprises a further glassy component, it may generally happen that an inhomogeneous glass matrix is formed. In this case, generally, without being limited to a specifically described embodiment, the glass matrix will have a different composition than the glassy component.

According to one embodiment of the invention, at least for the case that the coating or paste does not include a further glassy component, the glass powder in the paste and the glass matrix of the corresponding coating has the following composition, in wt %:

$SiO_2$ 30-75, preferably 44-75
$Al_2O_3$ 0-25, preferably 0.2-25, most preferably 2-25
$B_2O_3$ 0-30, preferably 1-30, most preferably 5-30
$Li_2O$ 0-12
$Na_2O$ 0-25, preferably 0-15
CaO 0-12
MgO 0-9
BaO 0-27
SrO 0-4
ZnO 0-35, preferably 0-20

$Bi_2O_3$ 0-5
$TiO_2$ 0-10, preferably 0-5
$ZrO_2$ 0-7
$As_2O_3$ 0-1
$Sb_2O_3$ 0-1.5
F 0-3
Cl 0-1, preferably free of Cl, except for unavoidable traces
$H_2O$ 0-3.

The glass of the glassy component preferably has a minimum $Al_2O_3$ content of 0.2 wt %, preferably of at least 2 wt %. Alternatively or additionally, the glass has a $%_2O_3$ content of at least 1 wt %, preferably at least 5 wt %.

It has furthermore been found to be advantageous if the glass of the glassy component contains at least 1 wt % of an alkali oxide selected from the group consisting of $Na_2O$, $Li_2O$, and $K_2O$ or mixtures of these oxides.

Alternatively or additionally, the glass of the glassy component comprises at least 1 wt % of a further oxide or of a mixture of oxides selected from the group consisting of CaO, MgO, BaO, SrO, ZnO, $ZrO_2$, and $TiO_2$.

According to another embodiment, the glass of the glassy component has the following composition, in wt %:
$SiO_2$ 6-65, preferably 10-65, most preferably 15-65
$Al_2O_3$ 0-20
$B_2O_3$ 0-40, preferably 1-30, most preferably 3-30
$Li_2O$ 0-12
$Na_2O$ 0-18
$K_2O$ 0-17
CaO 0-17
MgO 0-12
BaO 0-38
SrO 0-16
ZnO 0-70
$TiO_2$ 0-10, preferably 0-5
$ZrO_2$ 0-5
$Bi_2O_3$ 0-75, preferably 0-60, more preferably 5-60, most preferably 10-60
CoO 0-5
$Fe_2O_3$ 0-5
MnO 0-10
$CeO_2$ 0-3
F 0-3
Cl 0-1
$H_2O$ 0-3.

In a preferred implementation of the embodiment, the glass of the glassy component has a minimum $SiO_2$ content of 10 wt %, preferably at least 15 wt %. As an alternative or in addition, the glass has a minimum $Bi_2O_3$ content of 5 wt %, preferably of at least 10 wt %. Alternatively or additionally, the glass contains at least 1 wt %, preferably at least 3 wt % of $B_2O_3$. The total content of alkali oxides $Na_2O$, $Li_2O$, and $K_2O$ is preferably at least 1 wt %.

The glass or the glass matrix included in the paste of the respective coating may in particular be an alkali-free glass, an alkali-containing glass, a silicate glass, a borosilicate glass, a zinc silicate glass, a zinc borate glass, a zinc borosilicate glass, a bismuth borosilicate glass, a bismuth borate glass, a bismuth silicate glass, a phosphate glass, a zinc phosphate glass, an aluminosilicate glass, or a lithium aluminosilicate glass (especially for the case that the paste or the resulting coating does not include a further glassy components). According to one embodiment of the invention, the paste includes glass powders with different glass compositions.

According to one embodiment, the content of toxicologically questionable components lead, cadmium, mercury, and/or chromium(VII) compounds in the glass is less than 500 ppm.

According to a further embodiment, the glass substrate comprises a soda-lime glass. In particular, it is possible that the glass substrate is in the form of a soda-lime glass sheet or is made of soda-lime glass.

Soda-lime glass is a widely used glass, comprising the components CaO, $Na_2O$, and $SiO_2$ as major constituents, in percent by weight on an oxide basis. Constituents are referred to as major constituents if they are contained in the glassy material in an amount of at least 5 wt %. Glass substrates made of or comprising soda-lime glass are therefore usually inexpensive and available in sufficient quantities. However, soda-lime glass has a quite high coefficient of thermal expansion, which is disadvantageous, for example in applications in which a glass substrate or glass element is exposed to high thermal loads during operation.

However, it is just the combination of soda-lime glass as the glassy material the glass substrate is made of and the coating according to the embodiments presently described, which surprisingly represents a possibility of achieving a compromise between an inexpensive and highly available substrate material and adequate thermal shock resistance. This is because, as stated before, the coating according to embodiments enables to establish a certain compressive stress on the surface of the glass element. Therefore, it is also possible in this way to further advantageously promote a thermally toughened state (i.e. a compressive stress obtained by a thermal process) of a glass substrate or glass element by the coating.

According to one embodiment, the glass element is distinguished by a breaking strength, as determined in a ball drop test, of at least 70 cm or at least 28 inches, preferably at least 80 cm or at least 31 inches, based on a thickness of the glass element of 4 mm. The test procedure is conducted according to the test method in compliance with DIN 52306, which is as follows:

The coated test specimen is placed on a rectangular frame, the frame being a metallic frame on which a rubber is placed as a support so as to avoid direct contact between the glass sample and the metallic frame. A metal ball with a weight of about 535 g and a diameter of about 50.8 mm is dropped from an initial drop height of 26 inches (corresponding to about 66 cm). The drop height is then increased in increments of one inch until the glass breaks. The drop height at which breakage occurs is noted. The test is performed similarly for further samples, with preferably at least 30 samples being tested, for statistical reasons. The specified value of breaking strength is the mean value of the drop height at which breakage occurs.

The samples may in particular be provided or are provided in a toughened state.

Such an embodiment is particularly advantageous since it has been found that a glass element according to the presently described embodiments allows to achieve breaking strengths, as determined in a ball drop test described above, which exceed the values achieved for prior art glass elements by up to 30%.

Therefore, the glass element according to embodiments of the present disclosure permits to address applications in which increased strength is required. Alternatively, it is also possible to reduce the substrate thickness of the glass element while retaining the same mechanical strength of the glass element compared to a conventional glass element.

According to one embodiment, the filler particles comprise $SiO_2$ and/or $Al_2O_3$. Both $SiO_2$ and $Al_2O_3$ are oxides that exhibit very high temperature stability and therefore they are suitable as fillers for the coating according to embodiments, as they are thermally stable in particular at firing temperatures which are common for glass-based coatings. Furthermore, these are substances that are harmless from an environmental and health point of view, and moreover they are readily available. Both compounds are colorless, so that any impact on the color location of the coating is fairly low given the preferred weight fractions of the filler in the coating.

Both $SiO_2$ and $Al_2O_3$ occur in different modifications, both crystalline and amorphous, so that it is possible with these components to vary the coefficient of thermal expansion of the filler over a wide range. It is also possible for the filler to comprise a compound or a solid mixture of $SiO_2$ and $Al_2O_3$, such as in the form of mullite.

According to a particularly preferred variant, the filler comprises silica, i.e. amorphous $SiO_2$, for example in the form of so-called pyrogenic silica (or fumed silica) or consists predominantly of silica, i.e. more than 50 wt % thereof, or substantially, i.e. more than 90 wt % thereof, or even completely, except for unavoidable impurities. Silica may be particularly preferred because it has a very low coefficient of thermal expansion of about $0.5*10^{-6}$/K. The filler may preferably be in the form of pyrogenic silica comprising particles with a $d_{50}$ value of particle size distribution, based on the equivalent diameter, between 0.3 and 0.5 µm, e.g. 0.4 µm.

Alternatively or additionally to the filler, the coating may for instance comprise a further glassy component, for example a borosilicate glass, or may be made from a glass such as borosilicate glass. For example, the further glassy component may comprise a glass comprising the following constituents, in mol %, on an oxide basis:

$SiO_2$ 55 to 70 mol %,
$Al_2O_3$ 2.5 to 8 mol %,
$Bi_2O_3$ 0.5 to less than 4 mol %,
$B_2O_3$ 14 to 27 mol %,
at least 2.5 mol % of at least one oxide from the group consisting of $Li_2O$, $Na_2O$, and $K_2O$, and
a ratio of alkali oxides to aluminum oxide $\Sigma R_2O/Al_2O_3$ of less than 6.

For example, in this case, the further glassy component may have the following composition, in wt %, on an oxide basis:

$Al_2O_3$ 6.0
$Bi_2O_3$ 9.2
$SiO_2$ 57.4
$Na_2O$ 0.21
$Li_2O$ 4.1
$B_2O_3$ 22.6.

Generally, it may be advantageous for the filler to comprise filler particles with a $d_{50}$ value of the equivalent diameter of 5 µm or less. Since the further glassy component also is initially added to the paste in the form of a powder, the values given above for the equivalent diameter also apply to the further glassy component. This is advantageous if the further glassy component is formed to comprise a glassy material which is obtained in particular in a process comprising the melting of a batch and a process of comminuting the so-obtained glassy material. Such a process does not allow to produce very small, fine particles in a cost-efficient way anymore, so that it is preferred to not aim for particle sizes that are excessively small for such a glassy material.

According to one embodiment it may be contemplated for the coating to comprise two or even more different fillers, which may have different particle size distributions, for example. In this way, a particularly favorable microstructure can result in the coating, for example a microstructure with high packing density. Alternatively or additionally, it is possible for the coating to comprise a further glassy component in addition to the filler or fillers.

According to a further embodiment, the coating is disposed in a laterally patterned manner, so that one area of the surface of the glass element on which the coating is disposed has no coating, and another area has the coating. The coating may preferably be applied in the form of a raster pattern such as a dot raster, and/or in the form of a frame. Raster pattern is to be understood here as a pattern of dots that are regularly distributed over an area and can be understood, for example, as the corner points of intersecting right-angled lines of a grid. In the context of the present disclosure it is possible for a dot grid that the size of the dots and/or the density of the dots on the area to be coated changes gradually or sectionwise.

For example, it is possible and may even be preferred that the coating is applied so as to entirely cover the surface of the glass substrate in a peripheral area in the form of a frame, and so that the degree of coverage of the surface area by the coating decreases towards the center of the surface, with the frame transitioning into a dot raster with an initially high degree of coverage and with the raster pattern changing towards the center by exhibiting a decreasing degree of coverage by the dot raster. Here, degree of coverage refers to the ratio of the coated surface area or areas of the glass substrate surface or glass element surface to the total surface area of the glass substrate.

The provision of the coating in the form of a frame may be particularly preferred because, for example, it is possible in this way to at least partially mitigate or reduce direct contact of the glass surface with sharp-edged or abrasive items or components in an installed state of the glass element—for example with a metal frame or metallic components in the form of mounting means. That is, in the peripheral area the coating can then be effective as a kind of scratch protection coating. Since scratches in the surface of a glass substrate or glass element reduce the mechanical strength thereof, a design of the glass element in which the coating defines a frame in the peripheral area will therefore be advantageous.

The coating may also be effective as a scratch or wear protection coating in the remaining areas of the glass element. The surface areas of the glass element covered by the coating are in fact somewhat elevated compared to the non-covered areas, so that the coating acts as a kind of spacer to the glass surface in this case. Although scratches on the glass surface cannot be completely prevented in this way, they can at least be reduced somewhat. However, the degree of coverage should not be too high in the central area of the glass element, since such coated glass elements may for instance also be used as a viewing window, for example in an oven door. Hence, a tradeoff has to be found here between sufficient coverage for the preferably targeted mitigation of surface damage and sufficient free surface area to allow to look through the glass element.

Preferably, the degree of coverage is at least 60%, preferably at least 65%, and most preferably at least 70%. The degree of coverage should preferably not be greater than 90%. However, generally, a full-surface coating is also possible, in particular if the glass element is to be used as an opaque sheet or cover.

According to a further embodiment, the glass element has a thickness between 3 mm and 10 mm. Here, thickness of the glass element refers to the cross dimension of the glass element, which is given by the distance between the two faces or main surfaces, without taking into account the thickness of the coating. The thickness of the glass element therefore corresponds to the thickness of the glass substrate. In the practical determination of the thickness of the glass element, however, due to the small layer thickness compared to the thickness of the glass substrate, it is approximately possible to determine the thickness of the glass element also in a coated area, for example in the peripheral area of the glass element where the coating is applied in the form of a frame.

The thickness of the glass element should be at least 3 mm. With a smaller thickness of the glass element or glass substrate, the mechanical strength of the glass substrate or glass element will be too low, so that it will not be suitable for many applications, for example as a control panel or as a viewing window in baking oven doors. However, the thickness of the glass substrate or glass element should not be too great either. This is because although a higher thickness results in an increase in mechanical strength, the weight of the glass element or glass substrate will also increase. Moreover, material costs increase. Therefore, the thickness of the glass element or glass substrate is preferably limited and is not more than 10 mm according to one embodiment.

According to a further embodiment, the coating has a thickness of up to 20 µm, preferably of up to 10 µm. The wet layer thickness, i.e. the layer thickness before firing, may in particular be up to 20 µm. The coating preferably has a thickness of at least 1 µm.

The thickness of the coating should be at least 1 µm. This ensures that the coating provides a sufficient covering effect. Also, in this way, the coating can advantageously fulfill the function of an at least partially wear-reducing coating, that is, for example, it can be effective as a type of "mechanical spacer" and at least partially reduce direct contact of an abrasive object with the non-coated surface of the glass element or glass substrate.

However, the coating should not be excessively thick. It has been known that an excessive thickness of the coating can reduce the mechanical strength of a glass element. High layer thicknesses of a coating may also cause flaking. That is why the thickness of the coating is preferably limited and is preferably not more than 20 µm, in particular not more than 10 µm.

The paste is preferably designed such that it can be used in common techniques of application to a glass substrate, in particular in screen printing. The firing conditions also preferably do not change compared to those of conventional pastes which do not contain any filler. It is in particular possible that the firing of the coating is achieved during the thermal toughening of the glass element.

Another aspect relates to a coating agent (or a paste or enamel paint) for producing an inorganic glass-based coating, preferably an enamel coating on a glass substrate. The coating agent comprises solid components which define a content of solids of the coating agent, and at least one liquid component such as a solvent. The solid components include at least one glassy component, at least one pigment comprising pigment particles, at least one filler comprising filler particles, and the filler is inorganic and comprises filler particles with a $d_{50}$ value, based on the equivalent diameter, between at least 0.1 µm, preferably at least 0.3 µm and less than 10 µm, and, alternatively or in addition to the at least one filler, a further glassy component.

According to one embodiment, the ratio of the total of the solid components to the total of liquid components of the coating agent is between 2 and 3.5, preferably between 2.2 and 3.1, based on the weight. Such a configuration is advantageous because in this way good processability of the coating agent is guaranteed. It can be applied well and flows well, but on the other hand its viscosity is not too low, so that a layer can in particular be applied by a printing process such as screen printing, for example.

According to one embodiment, the fraction of the glassy component in the content of solids of the coating agent is between 58 vol % and 78 vol %, preferably at most 73 vol %.

Such an embodiment is advantageous because the glassy component which may also be referred to as glass flux is effective as a binder in the coating. In other words, the glassy component of the coating agent melts during firing, at least partially, and bonds the other components of the coating agent or of the coating to one another and to the glass substrate. It is possible that the glassy component at least partially melts the other components of the content of solids in the coating agent and/or the glass substrate at least near the surface thereof, so that what is known as a melting reaction zone will form at the coating-to-glass substrate interface. This can be advantageous since it is possible in this way to achieve particularly good adhesion of the coating to the glass substrate. The content of the glassy component in the coating agent, e.g. the glass flux, should therefore be at least 32 wt % so as to allow for sufficient wetting and enveloping of the other solid components of the coating agent.

On the other hand, the content of the glassy component in the coating agent should not be too high. This is because it has been found that an excessive content of glass flux in a coating can lead to reduced mechanical strength of the glass element. In particular when a melting reaction zone forms, cracking may occur in the area of the interface, which accordingly reduces the strength of the glass substrate. The formation of cracks can be reduced if the content of the glassy component in the coating agent, and accordingly also in the coating resulting from the coating agent, is limited. Therefore, according to one embodiment, the coating agent and accordingly the coating resulting from the coating agent on the glass substrate or glass element after firing has a content of the glassy component of at most about 45 wt % or at most about 50 vol %.

The glassy component is included in the coating agent in the form of a powder, preferably comprising glass powder particles with a $d_{50}$ value from 1 µm to 5 µm, based on the equivalent diameter. Such a range of grain sizes is advantageous because it allows for uniform melting of the glass powder. This similarly also applies to the further glassy component if the coating agent comprises a further glassy component as an alternative or in addition to the at least one filler.

According to a further embodiment, the fraction of the pigment among the content of solids is between 5 vol % and 35 vol %, preferably between 5 vol % and 21 vol %. For example, the pigment content may be between 10 vol % and 19 vol %. The pigment is the color-imparting component in the coating resulting on the glass element or glass substrate from the firing of the coating agent. In order to achieve a sufficient covering effect of the coating, the fraction of pigment among the content of solids in the coating should be at least 5 vol %, and the coating should accordingly comprise at least 5 vol %. On the other hand, the color-imparting pigments are usually cost-intensive components, so that the fraction of pigment among the content of solids in the coating should not be too high or, accordingly, the coating should not contain too much pigment. The fraction of pigments in the content of solids of the coating agent is therefore preferably limited and is not more than 35 vol %, preferably not more than 21 vol % according to one embodiment. Correspondingly, the coating comprises at most 35 vol % of pigment, preferably at most 21 vol % of pigment. Inorganic pigments with high temperature resistance are preferred, for example pigments having a spinel structure, and $TiO_2$.

According to a further embodiment, the total fraction of filler and/or of the further glassy component among the content of solids in the coating agent is between 0.01 vol % and 60 vol %, preferably at most 35 vol %, more preferably at most 19 vol %, and most preferably at most 15 vol %. The fraction of filler and/or of the further glassy component may in particular even be 10 vol % or less in total. Low filler contents and/or low contents of the further glassy component in the coating agent or in the resulting coating already permit to achieve advantageous effects, for example with regard to the resulting mechanical strength of the glass element. However, it can be advantageous if the filler or the further glassy component makes up at least 0.5 vol % of the content of solids of the coating agent. On the other hand, it is advantageous if the amount of filler and the amount of the further glassy component is not too high. Otherwise, the adhesive strength and/or covering effect of the coating will no longer be sufficient. Therefore, the fraction of filler and the fraction of the further glassy component together, i.e. in total, among the content of solids of the coating agent should be at most 60 vol %, preferably at most 35 vol %, more preferably at most 19 vol %, and most preferably not more than 15 vol %, for example 10 vol % or even less.

If the coating agent comprises more than one filler or a filler and a further glassy component, the details on the content of solids as given above relate to the total of these additional components in each case.

A particular advantage of the coating agent according to the present disclosure is that it makes possible, in a surprisingly simple manner, to control the resulting coefficient of thermal expansion of the coating, given the thermal expansion coefficients of the individual components of the coating agent. For example, it is possible to modify a commercially available enamel paint or printing paint which comprises a glass flux and a pigment by adding an appropriate filler and/or a respective further glassy component such that a glass element according to embodiments can then be obtained with this resulting coating agent.

This is achieved using the formula already introduced above for calculating the resulting coefficient of thermal expansion of a mixture, $\alpha_M$:

$$\alpha_M = \Sigma_i v_i \alpha_i.$$

For calculating the resulting coefficient of thermal expansion, the volume fraction of the individual components of the solid content, namely pigment or optionally pigments, glassy component (also referred to as glass flux or glass frit), and filler or optionally fillers, or, alternatively or in addition to the filler(s), the further glassy component is multiplied by the respective coefficient of thermal expansion.

It has been found that when using a commercially available enamel paint, for example, it is possible in a simple manner to obtain a coating agent according to embodiments of the present disclosure by adding a filler or optionally a plurality of fillers or a mixture of fillers and/or a further glassy component. By using the formula given above to calculate the resulting coefficient of thermal expansion of the coating, it is possible to selectively adjust this coefficient using a filler or a plurality of fillers or alternatively or additionally a further glassy component when the volume fractions and coefficients of thermal expansion of the components contained in the commercial enamel paint are known.

The present disclosure therefore also relates to a method for producing a coating agent which comprises at least one pigment comprising pigment particles, at least one glassy component and at least one filler comprising filler particles or alternatively or additionally, a further glassy component, the method comprising the steps of: providing a coating agent comprising a glassy component and at least one pigment comprising pigment particles; defining a resulting coefficient of thermal expansion of the coating obtained from the coating agent on a substrate by firing, providing a filler comprising filler particles and/or providing a further glassy component; calculating the volume fraction of the filler in the coating agent; adding the filler to the coating agent according to the calculated volume fraction; and dispersing.

The dispersing step can favorably be performed using commonly employed dispersing processes, for example in a three roll mill or using a dissolver.

The method described is particularly suitable for components which have coefficients of thermal expansion within the limits as listed in the table below. The coefficient of linear thermal expansion is specified in units of $10^{-6}/K$. The lower part of the table gives the limits within which the resulting coefficients of thermal expansion of the coating can vary for a 10% addition of filler for different glassy components.

| Component | Expansion coefficient [$*10^{-6}$/K] | |
| --- | --- | --- |
| | Lower limit | Upper limit |
| Pigment | 9.5 | 10.9 |
| Glass substrate | 8.8 | 9.5 |
| Glassy component | 7 | 9 |
| Further glassy component (wgK) | 4.3 | 4.3 |
| Filler, example | 0.5 | 0.6 |
| α (10 wt % filler) | 6.4, preferably 6.65 | 8.2, preferably 8.0 |
| α (10 wt % wgK) | 6.8 | 8.3 |

The glass element according to the present disclosure is suitable, for example, for use as a control panel or as a viewing window, for example as a viewing window in a baking oven door, or as a door of a washing machine or a lid of a washing machine, or as a door or lid of a dryer, or as a cover panel (or so-called cooking surface), for example for a gas stove, or as a shelf, for example as a shelf for a refrigerator, or as a viewing window for a fireplace or an oven, or as an opaque cover plate and/or an opaque front panel of an appliance.

EXAMPLES

Examples of coating agents according to the present disclosure are listed below. The pigment used in each case was CI Pigment Black 28 which is a copper-chromium spinel, and two different types of Pigment Black 28 were used, which differed in particular with regard to the mean particle size, based on the $d_{50}$ value of the equivalent diameter. Pigment A had a mean size between 0.6 μm and 1.5 μm, pigment B between 0.4 μm and 1.2 μm.

The following table lists further examples of fillers (No. 1 to 4) and of a glass powder as a further glassy component (No. 5), which can be used as an additive in the coating according to the present disclosure.

| No. | Material | Density | mean size ($d_{50}$) (μm) | Misc. |
|---|---|---|---|---|
| 1 | Spherical $SiO_2$ powder | 2.2 | 0.4 | amorphous |
| 2 | Fused silica | 2.3 | 6 | crystalline |
| 3 | Polymethylsilsesquioxane pearls | 1.3 | 0.8 | amorphous |
| 4 | Spherical $SiO_2$ powder | 2.2 | 2.48 | amorphous |
| 5 | Glass powder | 2.4 |  | amorphous |

The glass powder is one which has a composition with the composition ranges mentioned above.

The glassy component that is used preferably has a composition comprising the following constituents in the following composition ranges (all data in wt %):

| Component | min | max |
|---|---|---|
| $Li_2O$ | 0.1 | 3 |
| $Na_2O$ | 2.5 | 12 |
| $K_2O$ | 0 | 2.5 |
| CaO | 0.015 | 2.0 |
| SrO | 0.0 | 1 |
| ZnO | 5 | 35 |
| $B_2O_3$ | 1 | 22.8 |
| $Al_2O_3$ | 0.1 | 20 |
| $SiO_2$ | 15 | 45 |
| $P_2O_5$ | 0 | 1.0 |
| $TiO_2$ | 1 | 7 |
| $ZrO_2$ | 0 | 2 |
| $Bi_2O_3$ | 0.07 | 55 |
| F | 0 | 3 |
| Cl | 0 | 1 |

Moreover, further constituents may be included as well, for example MnO or NiO, each preferably below 2 wt %, and optionally further additives and/or impurities.

The table below lists some examples. The substrate was a floated soda-lime glass in each case. The pigment A mentioned above was used as the pigment. The percentages relate to the respective volume fraction of the content of solids of the paste. The coating was applied by screen printing using a 77 screen printing mesh in each case. Also listed is the pasting ratio of powder to medium, i.e. the screen printing medium or screen printing oil used, given based on weight. The color location was measured on the colored side against a black tile. The coating was fired in a tempering furnace in each case. Comp. Ex stands for comparison example. Here, the glass frit was a glass frit containing bismuth.

|  | Example | | | |
|---|---|---|---|---|
| Layer composition | 1 | 2 | 3 | Comp. Ex |
| Fraction of glassy component | 59.3 % | 60.1 % | 54.6 % | 70 % |
| Fraction of pigment A | 25.2 % | 25.5 % | 23.5 % | 30 % |
| Additives | 1 | 2 | 2 | — |
| Fraction of additives | 15.5 % | 14.4 % | 21.9 % | — |
| Medium pasting ratio | 10:3.4 | 10:3.4 | 10:3.6 | 10:3.3 |
| Properties of coated substrate |  |  |  |  |
| Single Print |  |  |  |  |
| Sclerometer test 10 N | ok | ok | ok | ok |
| Optical density | 1.7 | 2.1 | 2.2 | 2.6 |
| L*a*b* | 29.9/−0.3/ −1.4 | 26.7/−0.1/ −0.7 | 25.7/0/ −0.7 | 26.2/−0.1/ −0.8 |
| Ball drop test (avg. in cm) | 89 | 86 | 81 | 64.0 |

The following two-part table lists further examples. Here, again, the substrate was floated soda-lime glass. The percentages relate to the volume fraction of the content of solids in the paste in each case. Again, pigment A was used here as the pigment in each case. The coating was applied by screen printing as a single print in each case. Furthermore, the pasting ratio of powder to medium is specified, i.e. the screen printing medium or screen printing oil used, again based on weight. The color location was measured on the colored side against a black tile. The coating was fired in a laboratory furnace in each case. The specification of the fillers relates to the numbers in the table above, in which fillers are listed. Different glass frits (1 and 2) were used, which contained bismuth in both cases. Glass frit 2 was a high-bismuth-containing glass frit. Glass frit 1 was also used in all of the examples of the preceding table.

| PART 1 | | | | | |
|---|---|---|---|---|---|
|  | Example | | | | |
| Layer composition | 4 | 5 | 6 | 7 | 8 |
| Glass frit No. | 1 | 2 | 2 | 1 | 1 |
| Fraction of glass | 59.3 | 60.0 | 50.0 | 48.1 | 60.1 |
| Fraction of pigment | 25.2 | 26.0 | 22.0 | 20.6 | 25.5 |
| Filler | 1 | 1 | 1 | 1 | 5 |
| Fraction of filler | 15.5 | 14.0 | 28.0 | 31.3 | 14.4 |
| Medium pasting ratio | 10:3.4 | 10:3.3 | 10:4.3 | 10:4.5 | 10:3.4 |
| Properties of coated substrate |  |  |  |  |  |
| Sclerometer test 10 N | ok | ok | ok | ok | ok |
| Optical density | 2.2 | 3.3 | 2.2 | 1.3 | 1.9 |
| Gloss (60°) | 81 | 54 | 4 | 3 | 109 |
| L*a*b* (SCE; on color side, black background) | 32.3/ −0.2/ −2.0 | 32.7/ −0.1/ −1.7 | 32.3/ −0.2/ −2 | 30.5/ −0.2/ −2.25 | 34.1/ −0.4/ −2.1 |

| PART 2 | | | |
|---|---|---|---|
|  | Example | | |
| Layer composition | 9 | 10 | 11 |
| Glass frit No. | 1 | 1 | 1 |
| Fraction of glass | 54.8 | 58.6 | 60 |
| Example | 9 | 10 | 11 |
| Fraction of pigment | 23.2 | 25.3 | 26 |
| Filler | 5 | 2 | 4 |
| Fraction of filler | 22.0 | 16.1 | 14 |
| Medium pasting ratio | 10:3.6 | 10:3.3 | 10:3.3 |
| Properties of coated substrate |  |  |  |
| Sclerometer test ION | ok | ok | ok |
| Optical density | 1.6 | 1.9 | 1.7 |
| Gloss (60°) | 107 | 50 | 86 |

-continued

PART 2

|  | Example | | |
| --- | --- | --- | --- |
| Layer composition | 9 | 10 | 11 |
| L*a*b* (SCE; on color side, black background) | 33.2/−0.3/ −2 | 36.0/−0.5/ −2.9 | 32.9/−0.3/ −2.0 |

The table below shows the ball drop values (mean value), determined from a total of 40 samples with a thickness of 4 mm, by way of example. Each of the glass elements was thermally toughened. For making the samples, the ceramic paint DV 173170 from Prince Minerals was used, to which fillers were added accordingly. It turns out that the use of a filler results in an improvement in breaking strength.

|  | | Example No. | | | |
| --- | --- | --- | --- | --- | --- |
|  | Reference | 1 | 2 | 3 | 4 |
| Prince Minerals - DV173170 | x | x | x | x | x |
| Filler content in vol % | 0 | 5 | 10 | 15 | 10 |
| Further glassy component |  | x | x | x |  |
| Filler (silica) |  |  |  |  | x |
| Ball drop test mean height (inch) | 29 | 32 | 36 | 36 | 36 |

BRIEF DESCRIPTION OF THE DRAWINGS

The invention will now be explained in more detail with reference to the figures in which the same reference symbols designate the same or equivalent elements, and wherein.

DETAILED DESCRIPTION

Figure 1:
FIGS. 1 to 3 are schematic side views of glass elements, not drawn to scale.

FIG. 1 shows a first schematic view, not drawn to scale, of a glass element 10 which comprises a sheet-like glass substrate 1. Sheet-like glass substrate 10 is flat here, that is, it is not curved. Sheet-like glass substrate 1 has a first surface 11 and a second surface 12 opposite the first surface 11. The surfaces may also be referred to as sides or faces and are so-called main surfaces of the glass substrate 1 or, correspondingly, of the glass element 10, because together they make up more than 50% of the surface of the substrate. Furthermore, d is the thickness of the glass substrate 1. The thickness of glass substrate 1 can also approximately be assumed to be the thickness of the glass element 10, because, unlike illustrated in the view for the sake of better comprehension, the thickness of coating 2 (not designated) is only very small in comparison to the thickness of glass substrate 1. Coating 2 is disposed at least in some areas on at least one of the surfaces 11, 12, here in fact on surface 11 of glass substrate 1. This is to be understood as meaning that the coating 2 does not need to cover the entire surface 11, but may rather be applied only in an area, so that another area of the surface will not be covered by the coating 2. Here, the coating is disposed in a central area of the surface 11, so that a peripheral area remains free. However, full surface coverage is also possible, as a matter of course. Furthermore, It is also possible for the coating to be disposed not only on one surface, but on both surfaces 11, 12 of the glass substrate. The coating 2 comes in the form of an inorganic, glass-based coating, preferably an enamel coating. It comprises at least one glassy component, preferably a glassy component that melts when being heated so that the glassy component may also be in the form of a glass flux or glass frit, for example. Such an embodiment may be particularly advantageous, because in this case the glassy component can be effective particularly well as a binder so as to envelop the further components of the coating, i.e. the pigment and a filler that is optionally included in the coating, and bond them to one another and to the substrate 1. Generally, it is also possible for the coating 2 to include a further glassy component, in addition to or as an alternative to a filler.

If the coating 2 includes a filler, the filler particles included in the filler advantageously have a $d_{50}$ value, based on the equivalent diameter, of at least 0.1 µm, preferably at least 0.3 µm and less than 10 µm, preferably less than 5 µm. Preferably, as a result of the embodiment of the coating 2 described above, a coefficient of thermal expansion of the coating 2 is less than or equal to the coefficient of thermal expansion of the glass substrate 1.

Figure 2:
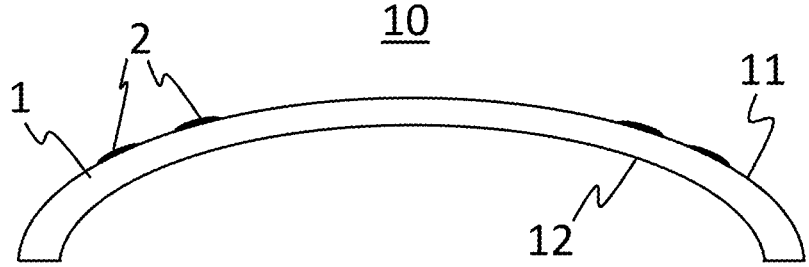

FIG. 2 shows a further schematic view, not drawn to scale, of an embodiment of a glass element 10 comprising a sheet-like glass substrate 1. Here, again, the sheet-like glass substrate 1 has two surfaces 11, 12 opposite to one another, and the coating 2 is disposed on areas of one of the surfaces 11, 12, namely on surface 11 in this case. The sheet-like substrate 1 is in the form of a curved sheet here. More generally, without being limited to the example illustrated here, it is possible that both surfaces 11, 12 have a coating 2 at least in some areas thereof.

Figure 3:
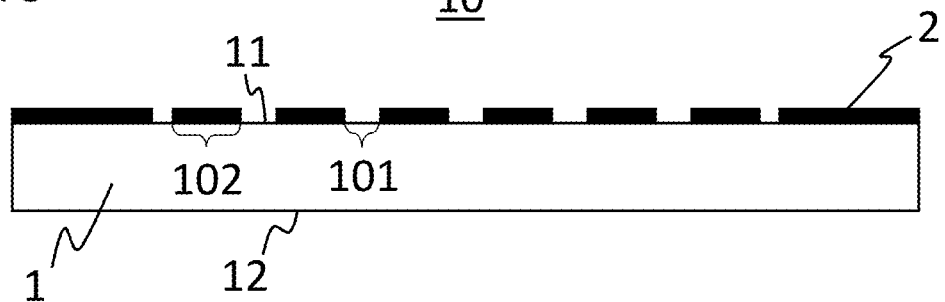

FIG. 3 shows yet another view of an embodiment of a glass element 10 for a more detailed explanation of a laterally patterned application of the coating 2. Here, the glass element 10 is designed so that the coating 2 is applied in a laterally patterned manner. This means that at least one area 101 of the surface 11, 12 of the glass substrate 1, here surface 11, has no coating 2, whereas another area 102 has the coating 2. Here again, more generally, it is possible for the coating 2 to be applied on both sides.

Figure 4:
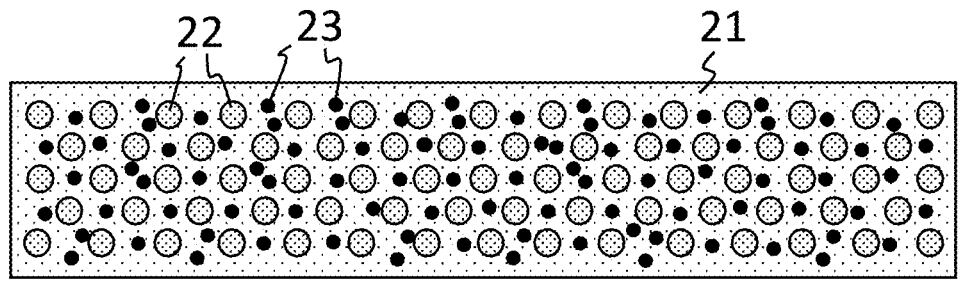
FIGS. 4 and 6 are respective schematic sectional views of a coating, not drawn to scale.

FIG. 4 shows a schematic sectional view of a coating 2 according to an embodiment, not true to scale. Coating 2 is in the form of an inorganic, glass-based coating, preferably an enamel coating. It comprises a glassy component 21, which preferably at least partially melts in a firing process and may in particular also be in the form of a glass flux or glass frit. As a result of the melting, the glassy component is advantageously capable of at least partially enveloping particulate constituents of the coating such as, for example, a pigment comprising pigment particles 22 and a filler comprising filler particles 23 and bonding them to one another and, optimally, to the substrate 1 (not shown). For the sake of clarity, not all pigment and filler particles 22, 23 have been designated. The glassy component 21 can therefore also be understood as a coating matrix or binder. Hence, the coating is a mixture of different components, so that a resulting coefficient of thermal expansion of the coating results from the volume fraction of the individual components and their respective expansion coefficients and can be calculated as explained above. Advantageously, this resulting coefficient of thermal expansion of the coating is less than or equal to the coefficient of thermal expansion of the glass substrate.

According to one embodiment, the filler particles 23 have a coefficient of thermal expansion of at least $0.5*10^{-6}$/K and preferably of at most $15*10^{-6}$/K, more preferably of at most $10*10^{-6}$/K, $8*10^{-6}$/K, yet more preferably of at most $5*10^{-6}$/K, yet more preferably of at most $3*10^{-6}$/K, and most preferably of not more than $0.6*10^{-6}$/K, so that preferably a resulting coefficient of thermal expansion of coefficient of the coating 2 of at most $9*10^{-6}$/K, preferably $8.3*10^{-6}$/K is obtained, the resulting coefficient of thermal expansion of the coating preferably being at least $6*10^{-6}$/K, most preferably at least $6.4*10^{-6}$/K.

The difference between the coefficients of thermal expansion of glass substrate 1 and coating 2 is preferably between at least $0.5*10^{-6}$/K and at most $3.1*10^{-6}$/K.

Figure 5:
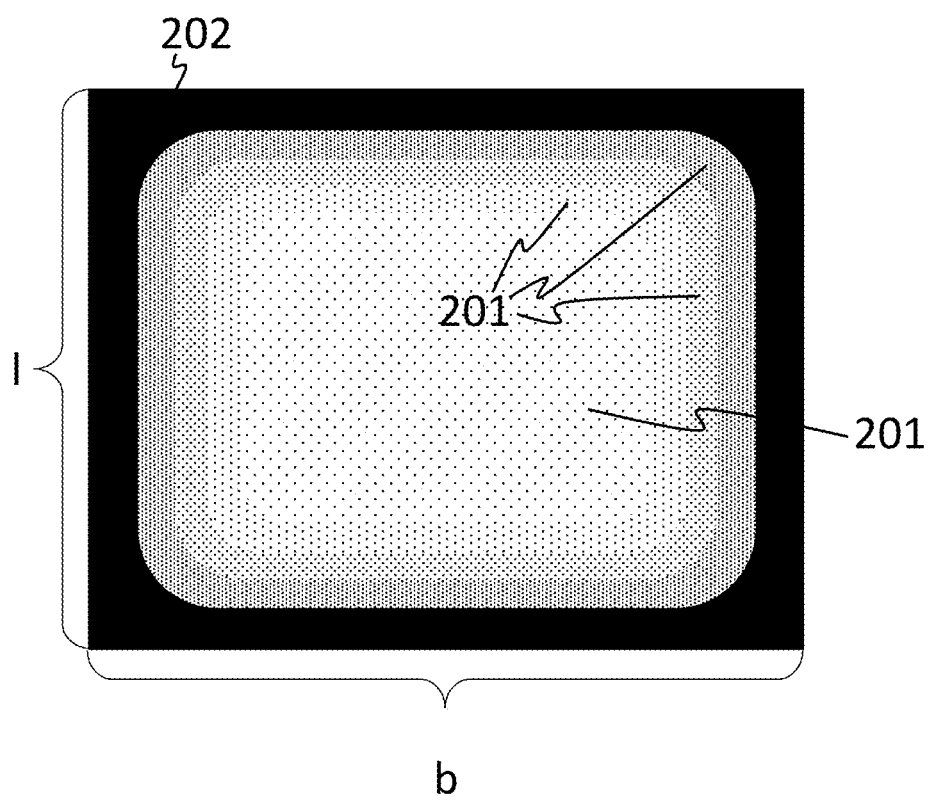
FIG. 5 is a schematic plan view of a glass element, not drawn to scale.

Finally, FIG. 5 shows a plan view of an exemplary glass element 10 according to one embodiment. Glass element 10 or, correspondingly, glass substrate 1 (not designated here) has a length l and a width b. The coating 2 is disposed on one surface of the glass substrate in a laterally patterned manner, here, such that the coating is applied as a covering coating in the form of a frame 202 in a peripheral area of the glass element. Here, covering coating is understood to mean that within the range of the frame the degree of coverage by the coating is nearly 100%, since the coating 2 is applied over the entire surface within the limits of the frame. In a central area of the substrate 1 or of the glass element 10, the coating is applied in the form of raster patterns 201 with different degrees of coverage. The degree of coverage calculated for the entire surface of glass element 10 is preferably between at least 60% and at most 90%. The degree of coverage is preferably at least 65%, most preferably at least 70%.

Figure 6:
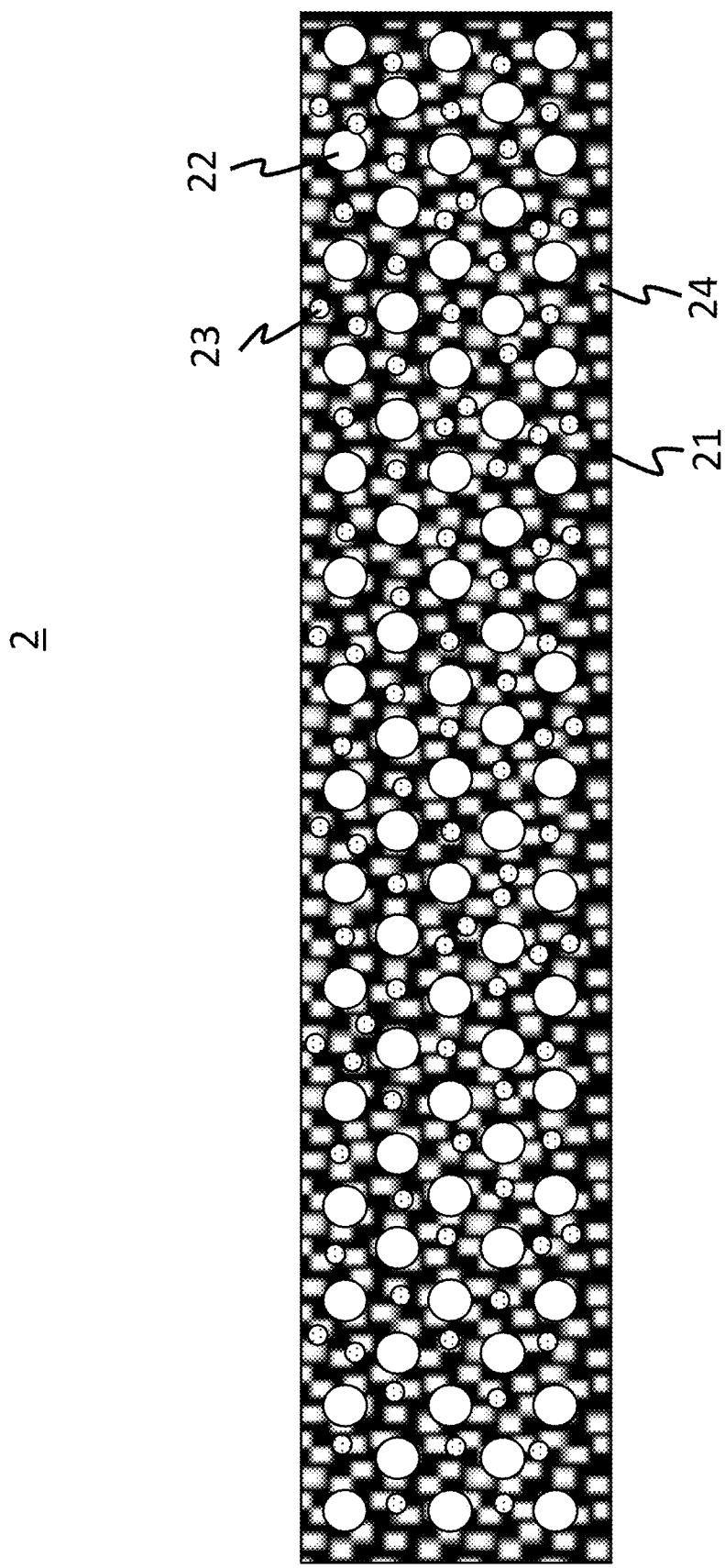

FIG. 6 shows a further variant of an embodiment of a coating 2. Here, the coating 2 is designed such that it comprises pigment particles 22 and filler particles 23 as well as a first glassy component 21 and a second glassy component 24. More generally, without being limited to the example of a coating 2 as illustrated in FIG. 6, it is also possible that the coating 2 does not include any filler comprising filler particles, but only a glassy component 21 and a further glassy component 24. Generally, it is possible according to one embodiment of the coating 2 as shown in FIG. 6 by way of example, that the coating 2 is designed so as to comprise two different glassy phases 21, 24, and thus a glass matrix comprising these two glassy phases 21, 24 is obtained. Thus, according to the example of FIG. 6, the glass matrix which preferably completely surrounds the particles of the coating 2, enveloping them and bonding them to the glass substrate 1 (not shown), is not homogeneous but includes two different glass phases. These glass phases may differ in particular with regard to their composition, which can be made visible using ToF-SIMS, for example.

Figure 7:
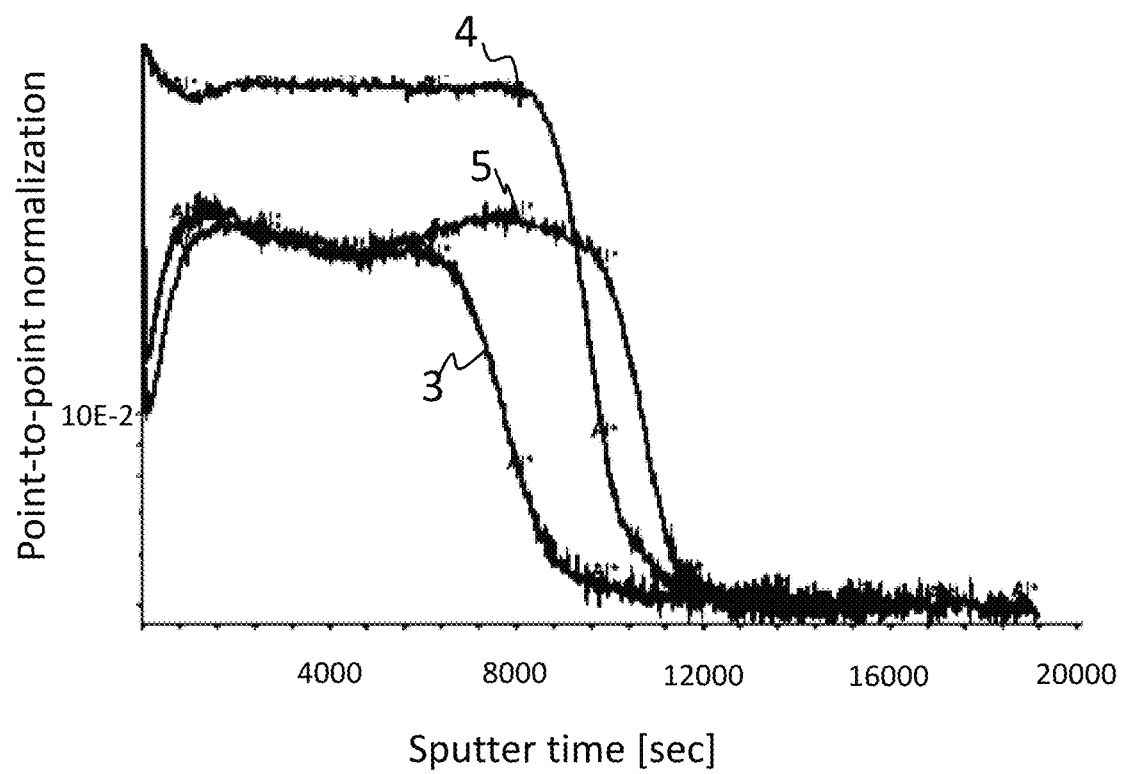
FIG. 7 shows ToF-SIMS profiles of exemplary embodiments and a comparison example.

FIG. 7 shows a graph of ToF-SIMS profiles of Example 1 (curve No. 3) and of Example 2 (labeled as curve No. 4) and of the comparison example (Comp. Ex), labeled as curve 5. Here, the signal of $Al^{3+}$ is shown. As can be seen, the signal of $Al^{3+}$ is significantly stronger in curve 4, because the material added as a further glassy component contains twice as much Al as the base enamel (the glassy component). This increased Al content of the coating is however not evenly distributed in the coating, rather it can be shown in graphical evaluations of ToF-SIMS measurements that the further glassy component does not completely mix with the glassy component of a base enamel.

LIST OF REFERENCE SYMBOLS

1 Glass substrate
10 Glass element
11, 12 Surfaces
101 Surface area without coating
102 Surface area with a coating
2 Coating
201 Raster pattern
202 Frame
21 Glassy component
22 Pigment particles
23 Filler particles
24 Second glassy component
3 ToF-SIMS profile of Example 1
4 ToF-SIMS profile of Example 2
5 ToF-SIMS of comparison example 2
d Thickness of glass substrate
l Length of glass substrate/glass element
b Width of glass substrate/glass element

What is claimed is:

1. A glass element, comprising:
    a sheet-like glass substrate having a first surface and a second surface opposite the first surface; and
    a coating disposed in at least some areas of at least one of the first and second surfaces,
    wherein the coating is an inorganic glass-based coating that comprises:
        glassy component;
        a second glassy component
        at least one pigment comprising pigment particles; and
        a filler, the filler being inorganic and comprising filler particles with a $d_{50}$ value, based on an equivalent diameter, of at least 0.1 μm and less than 10 μm,
    wherein the coating has a coefficient of thermal expansion that is less than or equal to a coefficient of thermal expansion of the glass substrate,
    wherein the coating has a glass matrix that has two glassy phases with different compositions and is inhomogeneous, and
    wherein the glass substrate comprises a soda-lime glass or is made from soda-lime glass.

2. The glass element of claim 1, wherein the inorganic glass-based coating is an enamel coating.

3. The glass element of claim 1, wherein the filler particles and/or the second glassy component have a coefficient of thermal expansion of at least $0.5*10^{-6}$/K and at most $15*10^{-6}$/K so that a resulting coefficient of thermal expansion of the coating is at least $6*10^{-6}$/K and at most $9*10^{-6}$/K.

4. The glass element of claim 3, further comprising a difference in the coefficients of thermal expansion of the glass substrate and the coating that is between at least $0.5*10^{-6}$/K and at most $3.1*10^{-6}$/K.

5. The glass element of claim 4, further comprising a color location, in an area where the coating is disposed, with an L* value of more than 60 and an optical density of more than 1 or with an L* value of less than 60 and an optical density of more than 2.

6. The glass element of claim 1, wherein the glassy component comprises, in wt %, on an oxide basis:
    $SiO_2$ 30-75;
    $Al_2O_3$ 0-25;
    $B_2O_3$ 0-30;
    $Li_2O$ 0-12;
    $Na_2O$ 0-25;
    CaO 0-12;
    MgO 0-9;

BaO 0-27;
SrO 0-4;
ZnO 0-35;
$Bi_2O_3$ 0-5;
$TiO_2$ 0-10;
$ZrO_2$ 0-7;
$As_2O_3$ 0-1;
$Sb_2O_3$ 0-1.5;
F 0-3;
Cl 0-1; and
$H_2O$ 0-3.

7. The glass element of claim 1, wherein the glassy component comprises, in wt %, on an oxide basis:
$SiO_2$ 6-65;
$Al_2O_3$ 0-20;
$B_2O_3$ 0-40;
$Li_2O$ 0-12;
$Na_2O$ 0-18;
$K_2O$ 0-17;
CaO 0-17;
MgO 0-12;
BaO 0-38;
SrO 0-16;
ZnO 0-70;
$TiO_2$ 0-10;
$ZrO_2$ 0-5;
$Bi_2O_3$ 0-75;
CoO 0-5;
$Fe_2O_3$ 0-5;
MnO 0-10;
$CeO_2$ 0-3;
F 0-3;
Cl 0-1; and
$H_2O$ 0-3.

8. The glass element of claim 1, further comprising a breaking strength as determined in a ball drop test conducted according to DIN 52306 of at least 70 cm measured on the glass element with a thickness of 4 mm.

9. The glass element of claim 1, wherein the filler particles comprise $SiO_2$ and/or $Al_2O_3$.

10. The glass element of claim 1, wherein the coating has a pattern such that one area of the first or second surface on which the coating is disposed has no coating and another area has the coating.

11. The glass element of claim 1, wherein the pattern is selected from a group consisting of a raster pattern, a dot raster pattern, and a frame pattern.

12. The glass element of claim 1, wherein the coating covers at least one of the first and second surfaces with a degree of coverage between 60% and 90%.

13. The glass element of claim 1, further comprising a thickness between 3 mm and 10 mm.

14. The glass element of claim 1, wherein the coating has a thickness of up to 20 µm and at least 1 µm.

15. The glass element of claim 1, wherein the glass element is sized and configured for a use selected from a group consisting of a control panel, a viewing window, a viewing window in a baking oven door, a viewing window in a washing machine door, a viewing window in a washing machine lid, a viewing window in laundry dryer door, a viewing window in laundry dryer lid, a cooking surface cover panel, a shelf, a refrigerator shelf, a viewing window in a fireplace, a viewing window in an oven, an opaque cover plate, and an opaque front panel of an appliance.

16. A coating agent for producing a glass-based inorganic coating on a glass substrate, comprising:
solid components; and
at least one liquid component, wherein the solid components comprise at least a first and a second glassy component, at least one pigment comprising pigment particles, and at least one filler comprising filler particles, wherein the filler is inorganic and comprises filler particles having a $d_{50}$ value, based on an equivalent diameter, between at least 0.1 µm and less than 10 µm; and
wherein the coating results in a glass matrix that has two inhomogeneous glassy phases with different compositions and a coefficient of thermal expansion that is less than or equal to a coefficient of thermal expansion of the glass substrate.

17. The coating agent of claim 16, further comprising a feature selected from a group consisting of: a ratio of a total of the solid components to a total of at least one liquid component between 2 and 3.5 based on weight; a ratio of a total of the solid components to a total of at least one liquid component between 2.2 and 3.1 based on weight; a fraction of the glassy component among a total content of the solid components between 58 vol % and 78 vol %; a fraction of the at least one pigment among a total content of the solid components between 5 vol % and 35 vol %; a fraction of the at least one pigment among a total content of the solid components between 5 vol % and 21 vol %; a fraction of the filler among a total content of solid components between 0.01 vol % and 60 vol %; a fraction of the filler among a total content of solid components between 0.01 vol % and 35 vol %; a fraction of the filler among a total content of solid components between 0.01 vol % and 19 vol %; and a fraction of the filler among a total content of solid components between 0.01 vol % and 15 vol %.

18. A method for producing a coating agent, comprising;
providing a coating agent comprising a first glassy component, a second glassy component, a filler comprising filler particles, and at least one pigment comprising pigment particles;
defining a resulting coefficient of thermal expansion of the coating obtained from the coating agent on a substrate by firing to provide a glass matrix that has two glassy phases;
calculating a volume fraction of the filler and of the second glassy component in the coating agent;
adding the filler and the second glassy component to the coating agent according to the calculated volume fraction; and
dispersing the filler and the second glassy component in the coating agent.

19. The method of claim 18, wherein the first and second glassy components have different compositions.

* * * * *